(12) United States Patent
Vehige

(10) Patent No.: US 11,124,047 B2
(45) Date of Patent: Sep. 21, 2021

(54) VEHICULAR HVAC SYSTEM WITH LIQUID-COOLED CHARGE AIR COOLER INTEGRATION

(71) Applicants: Hyundai Motor Company, Seoul (KR); Kia Motors Corporation, Seoul (KR)

(72) Inventor: Scott Vehige, Mojave, CA (US)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 92 days.

(21) Appl. No.: 16/179,913

(22) Filed: Nov. 3, 2018

(65) Prior Publication Data

US 2020/0139789 A1    May 7, 2020

(51) Int. Cl.
| | |
|---|---|
| *B60H 1/04* | (2006.01) |
| *F02B 29/04* | (2006.01) |
| *F01P 7/16* | (2006.01) |
| *B60H 1/00* | (2006.01) |
| *B60H 1/03* | (2006.01) |
| *B60H 1/22* | (2006.01) |

(52) U.S. Cl.
CPC .......... *B60H 1/04* (2013.01); *B60H 1/00328* (2013.01); *F01P 7/165* (2013.01); *F02B 29/0412* (2013.01); *F02B 29/0443* (2013.01); *F02B 29/0462* (2013.01); *F01P 2060/02* (2013.01); *F01P 2060/08* (2013.01)

(58) Field of Classification Search
CPC .. B60H 1/04; B60H 1/00328; B60H 1/00342; B60H 1/00335; B60H 1/10; B60H 1/03; B60H 1/22; B60H 2001/2296; F01P 7/165; F01P 2060/02; F01P 2060/08; F02B 29/0412; F02B 29/0443; F02B 29/0462

USPC .................................................. 237/12.3 B
IPC ..................... B60H 1/04,1/03, 1/10, 1/12, 1/22
See application file for complete search history.

(56) References Cited

U.S. PATENT DOCUMENTS

| | | | | |
|---|---|---|---|---|
| 4,207,848 | A * | 6/1980 | Dinger ................ | F02B 29/0412 |
| | | | | 123/556 |
| 6,098,576 | A * | 8/2000 | Nowak, Jr. ............... | F01P 3/20 |
| | | | | 123/41.33 |
| 8,424,331 | B2 | 4/2013 | Monforte | |
| 8,584,457 | B2 | 11/2013 | Kardos et al. | |
| 9,359,936 | B2 | 6/2016 | Brinkmann et al. | |

(Continued)

FOREIGN PATENT DOCUMENTS

| | | | | |
|---|---|---|---|---|
| EP | 3015674 A1 * | 5/2016 | ............... | F01P 3/22 |
| EP | 3392590 A1 * | 10/2018 | ............... | F28D 7/16 |
| WO | 2008-080872 A1 | 7/2008 | | |

*Primary Examiner* — Steven B McAllister
*Assistant Examiner* — Daniel E. Namay
(74) *Attorney, Agent, or Firm* — Mintz Levin Cohn Ferris Glovsky and Popeo, P.C.; Peter F. Corless

(57) ABSTRACT

A system for heating a cabin of a vehicle can include: a liquid-cooled charge air cooler configured to receive a liquid, to receive heated air from one of a turbocharger and a supercharger of the vehicle, to cool the heated air via the liquid, thereby heating the liquid, to output the cooled air to an intake manifold of an engine of the vehicle, and to output the heated liquid; and a multi-function heat exchanger connected to the liquid-cooled charge air cooler, the multi-function heat exchanger configured to receive the heated liquid outputted by the liquid-cooled charge air cooler, to generate heated air via the heated liquid, and to output the heated air into the cabin of the vehicle, thereby heating the cabin of the vehicle.

13 Claims, 9 Drawing Sheets

(56) References Cited

U.S. PATENT DOCUMENTS

| | | | | |
|---|---|---|---|---|
| 9,932,909 B1* | 4/2018 | Levijoki | ............. | F02D 41/2422 |
| 10,190,478 B1* | 1/2019 | Giraudo | .................... | F01P 7/16 |
| 10,508,587 B2* | 12/2019 | Gesa | ........................ | F01P 3/02 |
| 2007/0137909 A1* | 6/2007 | Zillmer | .................. | B60K 6/485 |
| | | | | 180/65.245 |
| 2013/0305708 A1* | 11/2013 | Zahdeh | .................... | F01P 3/20 |
| | | | | 60/599 |
| 2014/0366815 A1* | 12/2014 | Lu | ........................... | F28D 1/024 |
| | | | | 123/41.1 |
| 2015/0121847 A1* | 5/2015 | Pursifull | ............. | F02D 41/0077 |
| | | | | 60/274 |
| 2016/0123219 A1* | 5/2016 | Sheidler | ................ | F01N 3/0205 |
| | | | | 123/41.33 |
| 2016/0325601 A1* | 11/2016 | Richter | ................... | F01P 7/167 |
| 2017/0203635 A1 | 7/2017 | Kuroda et al. | | |
| 2017/0248065 A1* | 8/2017 | Liu | ........................ | F02B 37/00 |
| 2018/0163607 A1* | 6/2018 | Uto | .................... | F02B 29/0493 |
| 2018/0298807 A1* | 10/2018 | Sugihara | .................. | F01P 3/02 |
| 2018/0355787 A1* | 12/2018 | Julien | ................. | F02B 29/0418 |
| 2019/0032537 A1* | 1/2019 | Gesa | ........................ | F01P 3/02 |
| 2019/0032538 A1* | 1/2019 | Giraudo | .................... | F01P 3/20 |
| 2019/0032539 A1* | 1/2019 | Di Lorenzo | ............. | F01P 7/16 |
| 2019/0032542 A1* | 1/2019 | Scavone | .................. | F01P 3/02 |

* cited by examiner

-- PRIOR ART --

VEHICULAR HVAC SYSTEM WITH LIQUID-COOLED CHARGE AIR COOLER INTEGRATION

TECHNICAL FIELD

The present disclosure relates generally to heating, ventilation, and air conditioning (HVAC) systems in vehicles, and more particularly, to a vehicular HVAC system integrated with a liquid-cooled charge air cooler (LCCAC).

BACKGROUND

Most modern vehicular heating, ventilation, and air conditioning (HVAC) systems are designed to heat the vehicle cabin by circulating hot engine coolant through a radiator, called a heater core, typically located under the dashboard of the vehicle. A fan can be positioned next to the heater core to blow ambient (outside) air over fins of the core. As air travels over the heater core, heat is transferred from the hot coolant to the air, and hot air is blown through the heater vents into the cabin.

Problematically, when the vehicle is initially started, there can be a delay before the engine coolant is heated, as the engine has not yet warmed up. This problem is exacerbated in cold weather, where it can take minutes before the coolant becomes hot. Thus, it can take varying amounts of time for the vehicle cabin to warm up.

Meanwhile, liquid-cooled charge air coolers (LCCACs), also called air-to-liquid intercoolers or indirect charge air coolers (iCACs), are heat exchanger devices that can use liquid (e.g., water, coolant, a mixture thereof, etc.) in conjunction with a low-temperature coolant circuit to remove heat from the intake air of a turbo-charged or super-charged vehicle after the air has been compressed from the turbocharger or supercharger. To illustrate, FIG. 1 is a schematic view of a conventional LCCAC system. As shown in FIG. 1, hot compressed air (charge air) leaves the turbocharger (or supercharger) 120 and enters the LCCAC 110. Here, the hot air can exchange heat with a liquid (e.g., water, coolant, a mixture thereof, etc.) supplied to the LCCAC from a low-temperature radiator 130 using a pump 140.

After the heat exchange, the temperature of the charge air can be reduced and then supplied to the intake manifold of the engine 150 where the air is burned to produce power. By reducing the temperature of the compressed air, the air is densified which in turn can improve horsepower and fuel economy, as well as reduce emissions, upon introducing the air into the engine 150. Utilizing a cold or chilled liquid in the LCCAC 110 can further cool the charge air, and thus further improve the performance of the engine 150.

In addition, the exchange of heat between the hot, compressed air and the liquid supplied to the LCCAC 110 can heat the liquid. The hot liquid then travels back to the low-temperature radiator 130, where air traveling through the radiator 130 can cool the liquid, causing heat to be dumped to the environment. This process repeats, whereby cooled liquid can be pumped back to the LCCAC 110 to be heated again by the charge air.

SUMMARY

The present disclosure provides a vehicular HVAC system in which the heat removed from intake air of a turbo-charged or super-charged vehicle by an LCCAC can be harvested for the purpose of assisting the HVAC system in heating the vehicle cabin. The LCCAC can operate in conjunction with a multi-function heat exchanger described herein that is capable of replicating in a single package the functionality of several devices, including, but not limited to, a liquid chiller unit for the LCCAC, an HVAC heater, and an air conditioning (A/C) evaporator. The HVAC system with LCCAC integration can also include an electronically controllable switching unit configured to strategically route heated liquid from the LCCAC through the HVAC-LCCAC circuit in accordance with one of a plurality of predefined operation modes. Integration of the HVAC system and the LCCAC in the manner described herein can not only improve cabin heating but also enhance engine performance.

According to embodiments of the present disclosure, a system for heating a cabin of a vehicle can include: a liquid-cooled charge air cooler configured to receive a liquid, to receive heated air from one of a turbocharger and a supercharger of the vehicle, to cool the heated air via the liquid, thereby heating the liquid, to output the cooled air to an intake manifold of an engine of the vehicle, and to output the heated liquid; and a multi-function heat exchanger interconnected with the liquid-cooled charge air cooler, the multi-function heat exchanger configured to receive the heated liquid outputted by the liquid-cooled charge air cooler, to generate heated air via the heated liquid, and to output the heated air into the cabin of the vehicle, thereby heating the cabin of the vehicle.

The multi-function heat exchanger can be further configured to output the liquid which is received by the liquid-cooled charge air cooler. Also, the multi-function heat exchanger can be further configured to cool the liquid and, after the liquid has been cooled, to output the liquid which is received by the liquid-cooled charge air cooler.

The system can further include a low-temperature radiator connected between the liquid-cooled charge air cooler and the multi-function heat exchanger, the low-temperature radiator configured to receive the heated liquid outputted by the liquid-cooled charge air cooler, to cool the heated liquid via ambient air, and to output the cooled liquid.

In this regard, the multi-function heat exchanger can be further configured to receive the cooled liquid outputted by the low-temperature radiator, to further cool the cooled liquid, and to output the further cooled liquid. The liquid-cooled charge air cooler can be further configured to receive the further cooled liquid outputted by the multi-function heat exchanger, and to cool the heated air received from one of the turbocharger and the supercharger via the further cooled liquid. The liquid-cooled charge air cooler can be further configured to receive the cooled liquid outputted by the low-temperature radiator, and to cool the heated air received from one of the turbocharger and the supercharger via the cooled liquid In addition, the system can further include a switching unit configured to direct flow of the heated liquid outputted by the liquid-cooled charge air cooler to one or more of the multi-function heat exchanger and the low-temperature radiator. The switching unit can include a single-valve device, a multiple-valve device, or a single manifold. The switching unit can be electronically controlled, or alternatively, the switching unit can be mechanically controlled.

Furthermore, in accordance with embodiments of the present disclosure, a multi-function heat exchanger for a vehicle can include: a refrigerant inlet configured to receive a refrigerant after the refrigerant has been cooled by a condenser of the vehicle; a refrigerant outlet configured to output the refrigerant to a compressor of the vehicle after the refrigerant has been heated by the multi-function heat exchanger; a liquid inlet configured to receive a liquid after the liquid has been heated by a liquid-cooled charge air cooler of the vehicle; a liquid outlet configured to output the liquid to the liquid-cooled charge air cooler after the liquid has been cooled by the multi-function heat exchanger; and a plurality of layers coupled to the refrigerant inlet, the refrigerant outlet, the liquid inlet, and the liquid outlet, each layer of the plurality of layers including a finned chamber through which air flows, a refrigerant passage through which the refrigerant flows, and a liquid passage through which the liquid flows.

The plurality of layers can be configured such that the air flowing through the finned chamber is heated for release into a cabin of the vehicle. Also, the plurality of layers can be configured such that heat exchange among the air, the refrigerant, and the liquid is caused by the respective flows of the air, the refrigerant, and the liquid.

The refrigerant passage and the liquid passage in each layer of the plurality of layers can be disposed such that the refrigerant and the liquid flow through the multi-function heat exchanger in opposite directions. Also, the refrigerant passage and the liquid passage can be in contact with the finned chamber in each layer of the plurality of layers.

Each of the refrigerant passage and the liquid passage can include one or more tubes configured such that the one or more tubes of the refrigerant passage interlock with the one or more tubes of the liquid passage.

Furthermore, in accordance with embodiments of the present disclosure, a method can include: receiving a liquid at a liquid-cooled charge air cooler disposed in a vehicle; receiving heated air at the liquid-cooled charge air cooler from one of a turbocharger and a supercharger of the vehicle; cooling the heated air by the liquid-cooled charge air cooler via the liquid, thereby heating the liquid; outputting the cooled air by the liquid-cooled charge air cooler to an intake manifold of an engine of the vehicle; outputting the heated liquid by the liquid-cooled charge air cooler to a switching unit through which the heated liquid passes; and controlling the switching unit, thereby affecting a flow path of the heated liquid, in accordance with an operation mode of a plurality of predefined operation modes.

The controlling of the switching unit can include: identifying one or more input parameters including an ambient air temperature, an air temperature within a cabin of the vehicle, user input received via a heating, ventilation, and air conditioning (HVAC) system of the vehicle, and a user selection of a driving mode of the vehicle; selecting a particular operation mode among the plurality of predefined operation modes based on the one or more input parameters; and controlling the switching unit through which the heated liquid outputted by the liquid-cooled charge air cooler passes, thereby affecting the flow path of the heated liquid, in accordance with the determined operation mode. Also, the method can further include sending an electrical signal to the switching unit causing the switching unit to change the flow path of the heated liquid in accordance with the determined operation mode.

The plurality of predefined operation modes can include two or more of: 1) a cabin warm-up mode in which the heated liquid outputted by the liquid-cooled charge air cooler is routed to a multi-function heat exchanger disposed in the vehicle that is configured to generate heated air via the heated liquid and to output the heated air into a cabin of the vehicle, thereby heating the cabin of the vehicle, 2) a sport mode in which the heated liquid outputted by the liquid-cooled charge air cooler is routed to a low-temperature radiator disposed in the vehicle that is configured to cool the heated liquid via ambient air and to output the cooled liquid to the multi-function heat exchanger, wherein the multi-function heat exchanger is further configured to further cool the cooled liquid and to output the further cooled liquid to the liquid-cooled charge air cooler, 3) a comfort mode in which the heated liquid outputted by the liquid-cooled charge air cooler is routed to the low-temperature radiator and to avoid the multi-function heat exchanger, and 4) a normal mode in which all of the heated liquid outputted by the liquid-cooled charge air cooler is first routed to the low-temperature radiator then a non-zero portion is sent to the multi-function heat exchanger and a second non-zero portion of the heated liquid outputted by the liquid-cooled charge air cooler is routed to the bypass.

BRIEF DESCRIPTION OF THE DRAWINGS

The embodiments herein may be better understood by referring to the following description in conjunction with the accompanying drawings in which like reference numerals indicate identically or functionally similar elements, of which.

Figure 1:
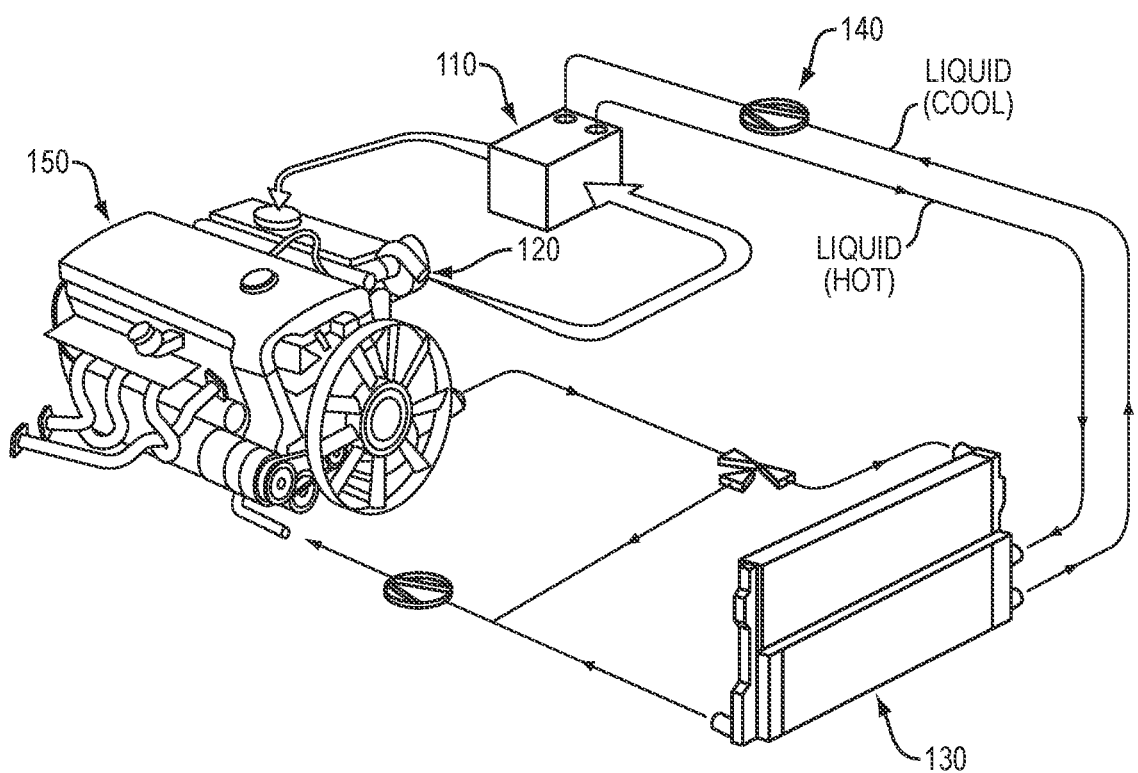
FIG. 1 is a schematic view of a conventional LCCAC system.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit, or electronic control unit (ECU). The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, devices, or the like, as described herein. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Referring now to embodiments of the present disclosure, the disclosed vehicular heating, ventilation, and air conditioning (HVAC) system can recycle heat removed from compressed intake air of a turbo-charged or super-charged vehicle by a liquid-cooled charge air cooler (LCCAC) for the purpose of assisting the HVAC system in heating the vehicle cabin. Particularly, the LCCAC can transfer the heat from charge air outputted by a vehicle's turbocharger or supercharger to a cooling fluid, thus heating the fluid. Then, the heated fluid can be routed from the LCCAC to the HVAC system where the heat of the fluid can be used to augment the cabin heating.

The LCCAC can operate in conjunction with a multi-function heat exchanger described herein that is capable of replicating in a single package the functionality of several devices, including, but not limited to, a liquid chiller unit for the LCCAC, an HVAC heater, and an air conditioning (A/C) evaporator. The multi-function heat exchanger can be capable of heating and cooling by flowing both refrigerant and a heated fluid simultaneously through different passages therein.

The HVAC system with LCCAC integration can also include an electronically controllable switching unit configured to strategically route heated liquid from the LCCAC through the HVAC-LCCAC circuit in accordance with one of a plurality of predefined operation modes in order to achieve different desired vehicle functions. The HVAC-LCCAC operation mode can be determined based upon a combination of selected driver modes and inputs from sensors such as ambient temperature and cabin temperature.

Figure 2:
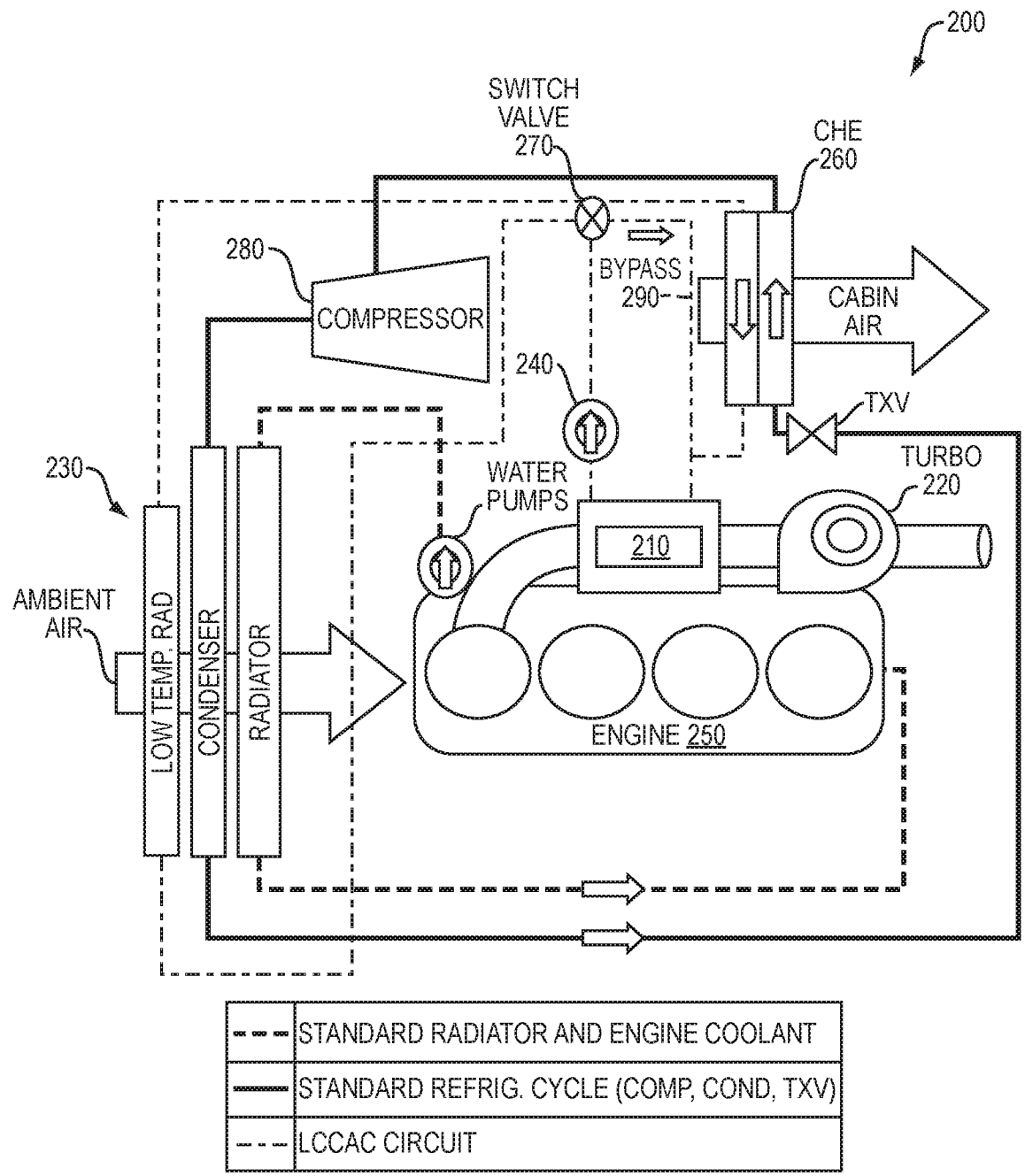
FIG. 2 is a simplified, schematic view of an example HVAC-LCCAC system for vehicle cabin heating.

FIG. 2 is a simplified, schematic view of an example HVAC-LCCAC system according to embodiments of the present disclosure. For simplicity, the HVAC system with LCCAC integration can be referred to herein as the "HVAC-LCCAC system."

As shown in FIG. 2, the HVAC-LCCAC system 200 can include an LCCAC 210 which receives intake air (charge air) from a turbocharger (or supercharger) 220 after the air has been compressed and heated. The LCCAC 210 can use liquid (e.g., water, coolant, a mixture thereof, etc.) provided thereto through the LCCAC circuit to remove heat from the intake air. Specifically, the hot air can exchange heat with the liquid within the LCCAC 210, thereby cooling the charge air and heating the liquid.

After the heat exchange, the LCCAC 210 can supply the cooled air to the intake manifold of the engine 250 where the air is burned to produce power (e.g., to rotate the crankshaft of the vehicle). As explained above, reducing the temperature of the compressed air densifies the air provided to the engine 250, which in turn can improve overall engine performance (e.g., improved horsepower, greater fuel economy, reduced emissions, etc.). The colder the liquid supplied to the LCCAC 210 is, the more the charge air can be cooled, and thus further improve the performance of the engine 250.

In addition to outputting the cooled air to the engine 250, the LCCAC 210 can output liquid that has been heated by way of the previously hot charge air. Instead of dumping heat from the liquid into the environment, as conventionally performed, heat from the hot liquid outputted by the LCCAC 210 can be harvested for the purpose of heating the cabin of the vehicle (not shown), in accordance with embodiments of the present disclosure. The process of harvesting said heat will be described in greater detail below.

The HVAC-LCCAC system 200 can further include a multi-function heat exchanger (CHE) 260 interconnected with the LCCAC 210 through a configuration of conduits (e.g., pipes, tubes, etc.) comprising the LCCAC circuit, as shown in FIG. 2. The multi-function heat exchanger 260 can replicate in a single package the functionality of several devices, including, at least, a liquid chiller unit for the LCCAC 210, an HVAC heater, and an air conditioning (A/C) evaporator. Upon receiving the heated liquid outputted by the liquid-cooled charge air cooler 210, the multi-function heat exchanger 260 can use the heated liquid to generate heated air, and then output the heated air into the cabin of the vehicle, thereby heating the cabin of the vehicle. Introducing heated air into the vehicle cabin in this manner can expedite the cabin heating process, particularly in cold weather conditions.

In greater detail, the multi-function heat exchanger 260 can be capable of heating and cooling by flowing both refrigerant and heated liquid simultaneously through different passages therein. To illustrate, FIG. 3 includes a side view and a close-up view of the multi-function heat exchanger 260, which can include an inlet 300 and outlet 302 for refrigerant, and an inlet 310 and outlet 312 for liquid (e.g., water, coolant, a mixture thereof, etc.).

The refrigerant inlet 300 can receive a refrigerant. Typically, the refrigerant gas has been compressed by a compressor 280, turning the refrigerant into a high-pressure hot gas, and then cooled to a liquid state in a condenser. The refrigerant can travel from the condenser to an expansion device (commonly a thermal expansion valve (TXV) or orifice tube), as shown in FIG. 2, before entering the refrigerant inlet 300 of the multi-function heat exchanger 260, wherein evaporation of a liquid refrigerant rapidly absorbs heat from its surroundings, thus making the multi-function heat exchanger 260 similar to a conventional A/C evaporator. A proximately positioned fan (not shown) can blow air over the multi-function heat exchanger 260, a process which cools the air via the cold refrigerant, and into the vehicle cabin to provide air conditioning when needed.

The liquid inlet 310 can receive a liquid that has been heated by the LCCAC 210. The liquid, which has been heated in the LCCAC 210 by way of the hot charge air emitted from the turbocharger 220, as explained above, can be pumped from the LCCAC 210 using pump 240 through a switching unit 270 (described in greater detail below). The hot liquid can be routed through the switching unit 270 either to the low-temperature radiator 230 and then to the multi-function heat exchanger 260, or to the multi-function heat exchanger 260 directly, as shown in FIG. 2.

Figure 3:
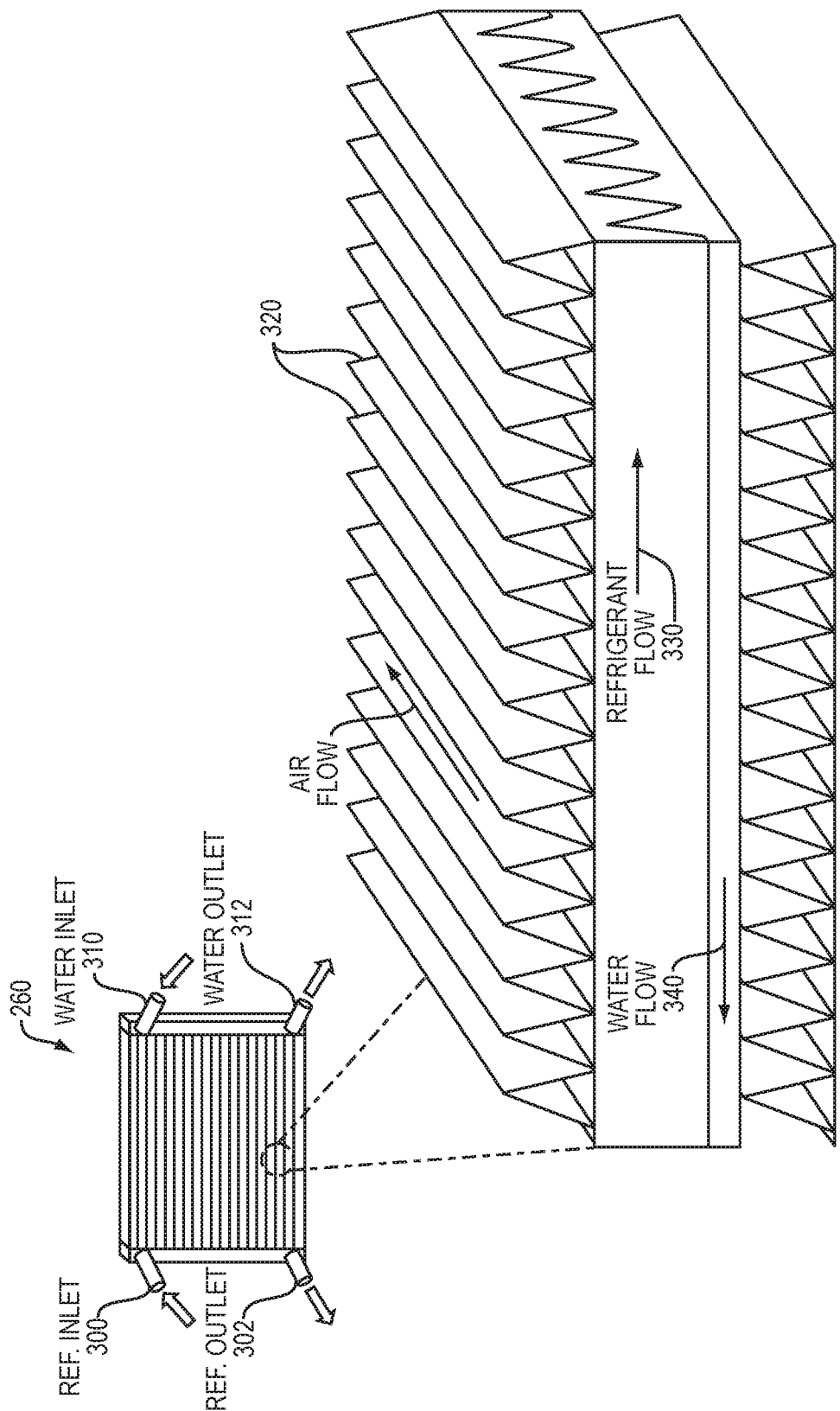
FIG. 3 includes a side view and a close-up view of an example multi-function heat exchanger.

When the hot liquid and the cold refrigerant flow through the multi-function heat exchanger 260, heat exchange can occur between the fluids, thus heating the refrigerant and cooling the liquid. In this regard, the multi-function heat exchanger 260 can include a plurality of layers coupled to the refrigerant inlet and outlet 300 and 302, and the liquid inlet and outlet 310 and 312. Each layer of the plurality of layers can include a refrigerant passage 330 through which the refrigerant flows, a liquid passage 340 through which the liquid flows, and a finned chamber 320 including a plurality of fins through which air flows, as shown in FIG. 3.

In one example, the refrigerant passage 330 and the liquid passage 340 can be arranged in a stacked manner within each layer of the plurality of layers. In a specific implementation, the refrigerant passage 330 and the liquid passage 340 can each include one or more conductive tubes (or pipes or similar conduits) with ridges, as shown in FIG. 3, configured such that the one or more tubes of the refrigerant passage 330 interlock with the one or more tubes of the liquid passage 340. Such configuration of the refrigerant passage 330 and liquid passage 340 can increase the surface area contact therebetween, thereby enhancing the heat transfer. Furthermore, the refrigerant passage 330 and the liquid passage 340 can be disposed such that the refrigerant and the liquid flow through the multi-function heat exchanger 260 in opposite directions, thereby further enhancing the heat transfer therebetween. It is understood, however, that the arrangement of the refrigerant passage 330 and the liquid passage 340 within the multi-function heat exchanger 260 is not limited to the above.

The refrigerant passage 330 and liquid passage 340 can be disposed within each layer so as to be in contact with the finned chamber 320. In this manner, as air (e.g., ambient air) passes through the finned chamber 320, the cold refrigerant passes through the refrigerant passage 330, and the hot liquid passes through the liquid passage 340, heat exchange can occur between the air, the refrigerant, and the hot liquid simultaneously, such that each fluid transfers energy with the other two fluids. As a result, air passing through the finned chamber 320 can be warmed or cooled by controlling flow rates of the cold refrigerant and the hot liquid within the multi-function heat exchanger 260, and then released into the cabin of the vehicle as desired.

For instance, air flowing through the finned chamber 320 can be heated for release into the vehicle cabin by increasing the amount of hot liquid flowing into the liquid inlet 310 from the LCCAC 210 in response to a user (e.g., driver or passenger) requesting a temperature increase through HVAC system. Conversely, air flowing through the finned chamber 320 can be cooled for release into the vehicle cabin by increasing the amount of cold refrigerant flowing into the refrigerant inlet 300 from the compressor/condenser in response to the user requesting a temperature decrease through HVAC system. Flow of liquid and/or refrigerant into the multi-function heat exchanger 260 can be controlled based on a variety of input parameters, as described in greater detail below. Thus, within the HVAC system of the vehicle, the multi-function heat exchanger 260 can either take the place of a dedicated A/C evaporator and/or a dedicated heater core, or be utilized in addition to the dedicated A/C evaporator and/or dedicated heater core.

After heat has been exchanged amongst the fluids flowing through the multi-function heat exchanger 260, refrigerant can be outputted through the refrigerant outlet 302. In most cases, the previously cold refrigerant has been heated by the hot liquid and/or ambient air in the multi-function heat exchanger 260. The heated refrigerant can be sent back into the refrigerant/air conditioning circuit to the compressor 280 for reuse, as shown in FIG. 2.

Similarly, the multi-function heat exchanger 260 can output liquid through the liquid outlet 312. In most cases, the previously hot liquid has been cooled by the cold refrigerant and/or ambient air in the multi-function heat exchanger 260. The cooled liquid can be sent to the LCCAC 210, which uses the liquid to cool the hot charge air of the turbocharger 220 in the manner explained above, as shown in FIG. 2.

As mentioned above, controlling the route of flow of the heated liquid outputted from the LCCAC 210 through the LCCAC circuit can affect several aspects of the HVAC system, including A/C and heater performance. Controlling the route of flow of the heated liquid can also affect the performance of the engine.

In this regard, the LCCAC 210 can output the heated liquid to a switching unit 270 that can direct flow of the liquid through the LCCAC circuit in a particular manner. The switching unit 270 can include a device capable of changing the flow direction of the liquid such as, for example, a single-valve device, a multiple-valve device, or a single manifold, each of which is described in greater detail below. Also, the switching unit 270 can be electrically controlled such that a flow configuration of the switching unit 270 changes upon receipt of a control signal, which can be transmitted by an electronic control unit (ECU) of the vehicle, for example.

The contents of the control signal can depend upon a desired operation mode of the HVAC-LCCAC system 200. The desired operation mode can be selected among a plurality of predefined operation modes, examples of which are described in greater detail below. Selection of an operation mode for the HVAC-LCCAC system 200 can depend on a variety of input parameters, such as, for example, an ambient (e.g., outside) air temperature, an air temperature within the cabin of the vehicle, user input received via the vehicle's HVAC system, a user selection of a driving mode of the vehicle, and the like. Various temperature sensors can be disposed throughout the vehicle for the purpose of measuring ambient and/or cabin temperature. Upon selection of a particular operation mode, which may be automatically performed by the ECU of the vehicle, the control signal can be transmitted to the switching unit 270 instructing the switching unit 270 to establish the liquid flow path in accordance with the selected operation mode. Therefore, operation of the HVAC-LCCAC system 200 can be optimized in light of a range of automatically measured and/or manually input parameters.

Alternatively, the switching unit 270 can be mechanically controlled. For example, the switching unit 270 can be controlled by a mechanical device, such as a lever, a cable, or the like, coupled to the switching unit 270 such that manipulation of the mechanical device can cause the switching unit 270 to change the liquid flow path.

To demonstrate, FIGS. 4-7 include simplified, schematic views of example operation modes for controlling the HVAC-LCCAC system 200. It is understood, however, that the operation modes of the HVAC-LCCAC system 200 are not limited only to those described herein.

Figure 4:
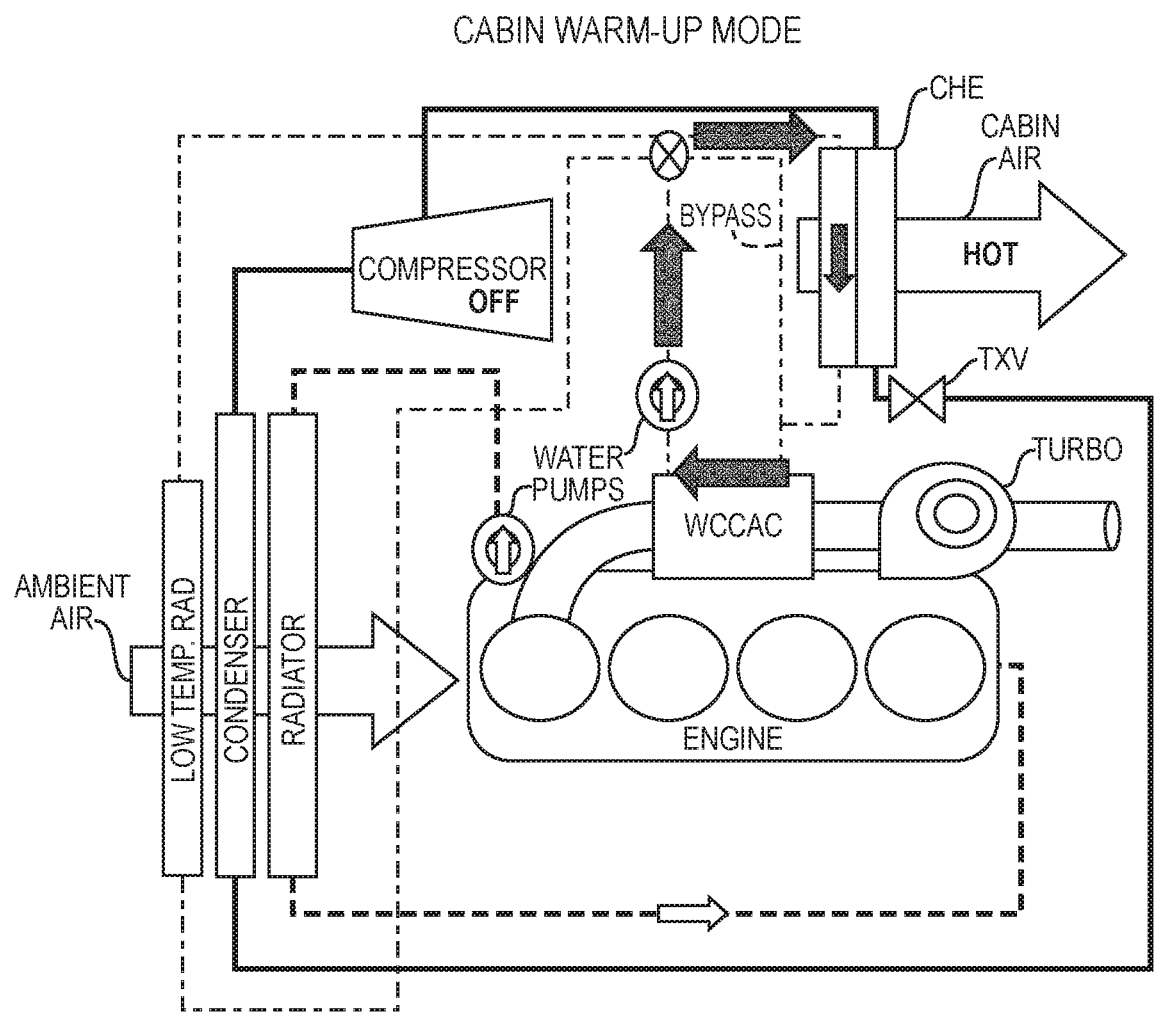
FIGS. 4-7 include simplified, schematic views of example operation modes for controlling the HVAC-LCCAC system of FIG. 2.

A first exemplary operation mode may correspond to a "cabin warm-up mode," as shown in FIG. 4. In this operation mode, the switching unit 270 can control the flow path of heated liquid outputted from the LCCAC 210 such that all liquid is routed directly to the multi-function heat exchanger 260. The compressor 280 can be turned off, and the HVAC system can be set to recirculate the cabin air. The result is that the maximum amount of heat harvested from the LCCAC 210 can be delivered to the cabin air for warmth. This utilizes the hot liquid from the LCCAC to heat cabin air passing though the multi-function heat exchanger, as explained above. The heated air can be blown into the vehicle cabin, thus reducing the time needed to heat the cabin. The cabin warm-up mode can be beneficial upon starting the vehicle, before the engine has warmed up, and particularly in cold weather conditions where it can take minutes for the engine coolant to be heated in normal operation.

The cabin warm-up mode can be activated upon detecting a cold ambient temperature (e.g., below a predefined threshold temperature) or in response to a user (e.g., driver or passenger) manually activating a maximum heat setting through the HVAC system. The operation mode can be deactivated upon the user reducing the heat setting through the HVAC system, whereupon the operation mode can return to a default (e.g., normal) mode.

Figure 5:
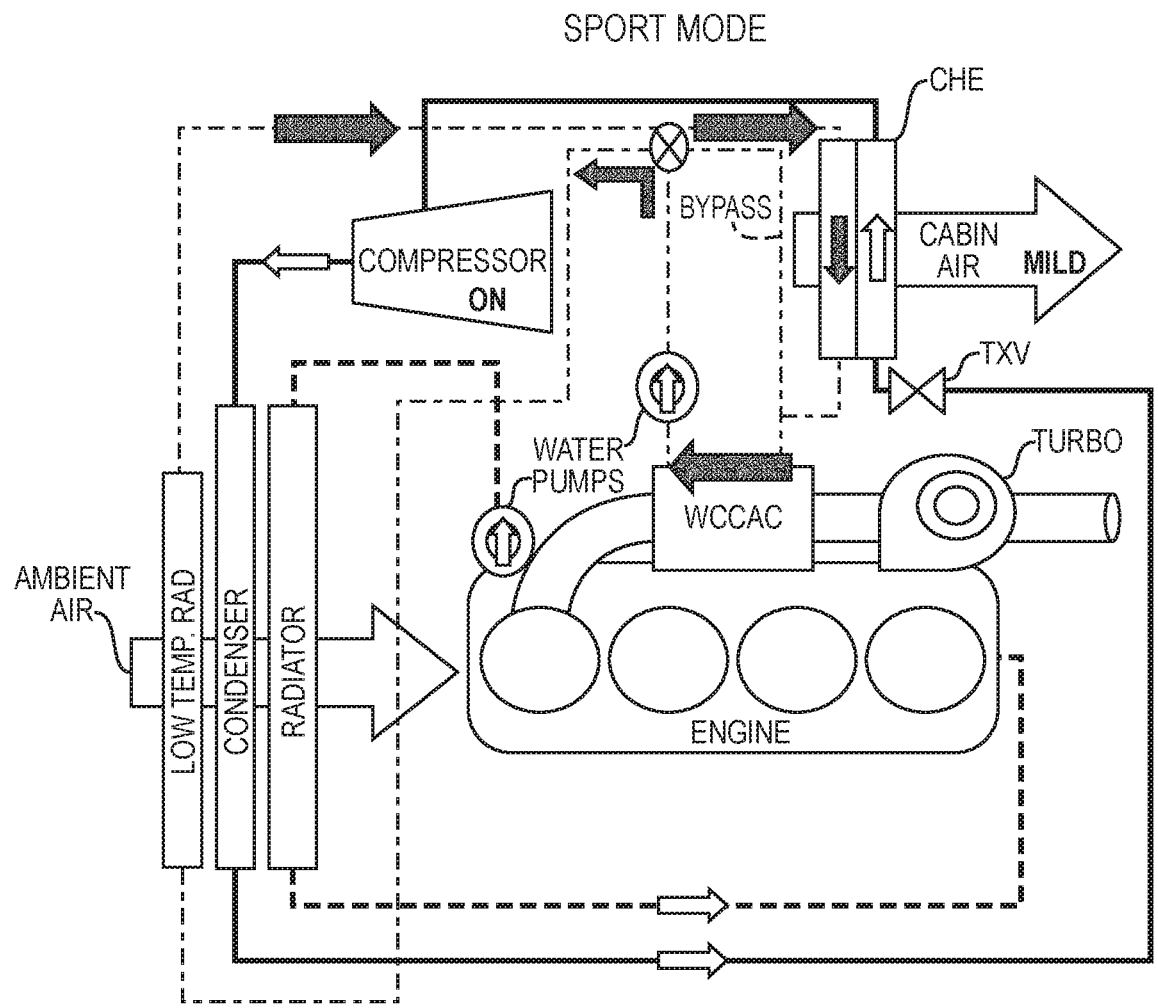

A second exemplary operation mode may correspond to a "sport mode," as shown in FIG. 5. In this operation mode, the switching unit 270 can control the flow path of heated liquid outputted from the LCCAC 210 such that the liquid is routed first to the low-temperature radiator 230, which can cool the hot liquid via heat transfer with ambient air and release the heat to the environment. Then, the cooled liquid can be sent to the multi-function heat exchanger 260 where the liquid can be even further cooled via heat transfer with the A/C refrigerant, as explained above. The compressor 280 can be turned on circulate the refrigerant, and the HVAC system can be set to recirculate the cabin air if the cabin temperature is less than the ambient temperature. The result is that the liquid provided to the LCCAC 210 is cooled to the lowest temperature possible within the LCCAC circuit. As explained above, utilizing a cold or chilled liquid in the LCCAC 210 can improve the performance of the engine 250. Thus, the sport mode can be beneficial when the user desires maximum driving performance from the engine 250.

The sport mode can be activated upon in response to a user manually activating a sport driving mode, or similar performance-enhancing driving mode, in the vehicle. The operation mode can be deactivated upon the user manually deactivating the sport driving mode or upon the user selecting a maximum cool setting through the HVAC system, whereupon the operation mode can return to a default (e.g., normal) mode.

Figure 6:
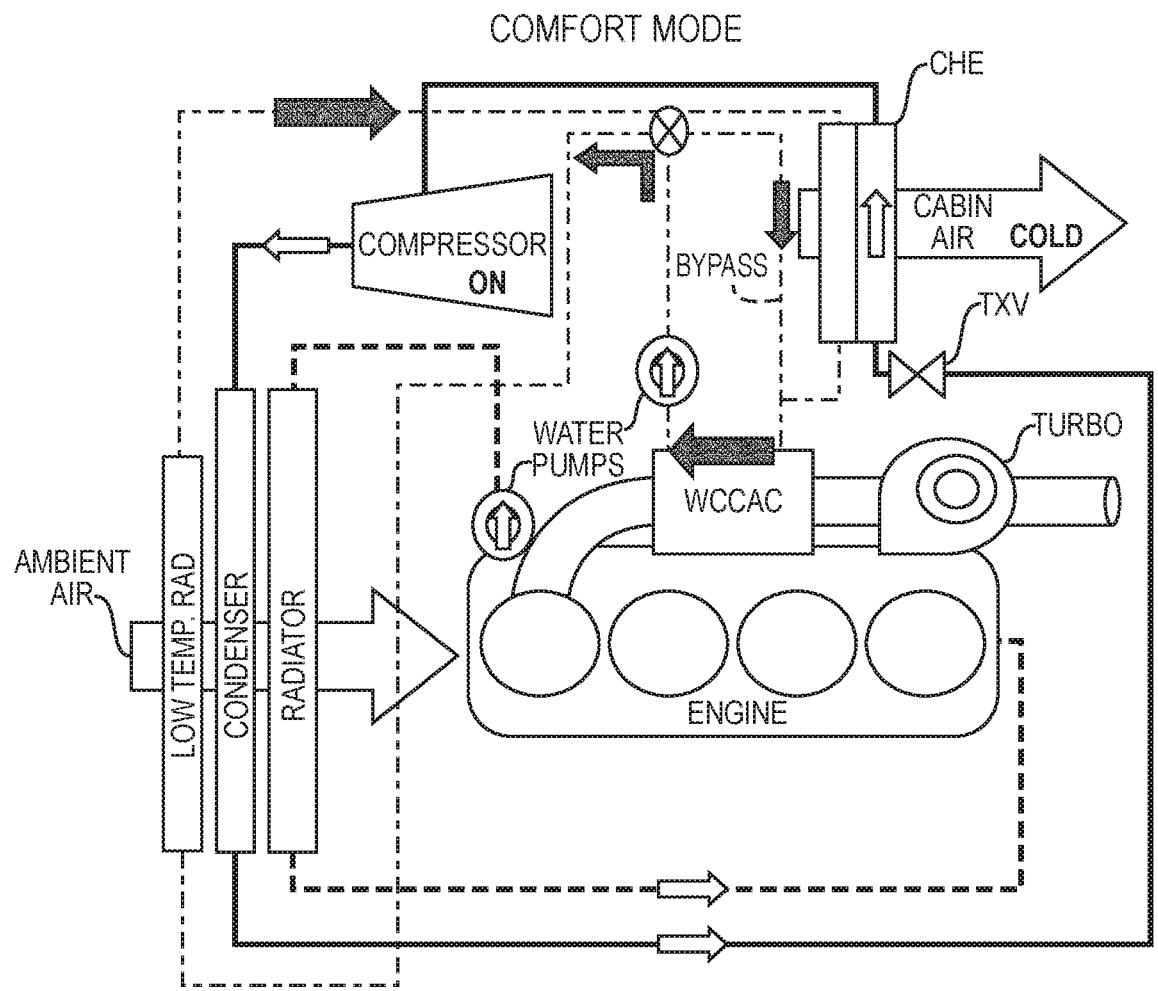

A third exemplary operation mode may correspond to a "comfort mode," as shown in FIG. 6. In this operation mode, the switching unit 270 can control the flow path of heated liquid outputted from the LCCAC 210 such that the liquid is routed to the low-temperature radiator 230, which can cool the hot liquid via heat transfer with ambient air and release the heat to the environment. Then, the liquid can be sent back to the LCCAC 210 without entering the multi-function heat exchanger 260. This can be accomplished by the switching unit 270 controlling the flow path such that, after passing through the low-temperature radiator 230, the liquid passes through the bypass 290, thereby avoiding the multi-function heat exchanger 260, en route to the LCCAC 210. The compressor 280 can be turned on circulate the refrigerant, and the HVAC system can be set to recirculate the cabin air. The result is that the A/C unit can function at its highest potential, allowing for air supplied to the vehicle cabin to be as cold as possible. Thus, the comfort mode can be beneficial when the user desires to cool the cabin quickly.

The comfort mode can be activated upon in response to a user manually activating a maximum cool setting through the HVAC system or when ambient temperature is above a predetermined value. The operation mode can be deactivated upon the user manually deactivating the maximum cool setting through the HVAC system, whereupon the operation mode can return to a default (e.g., normal) mode.

Figure 7:
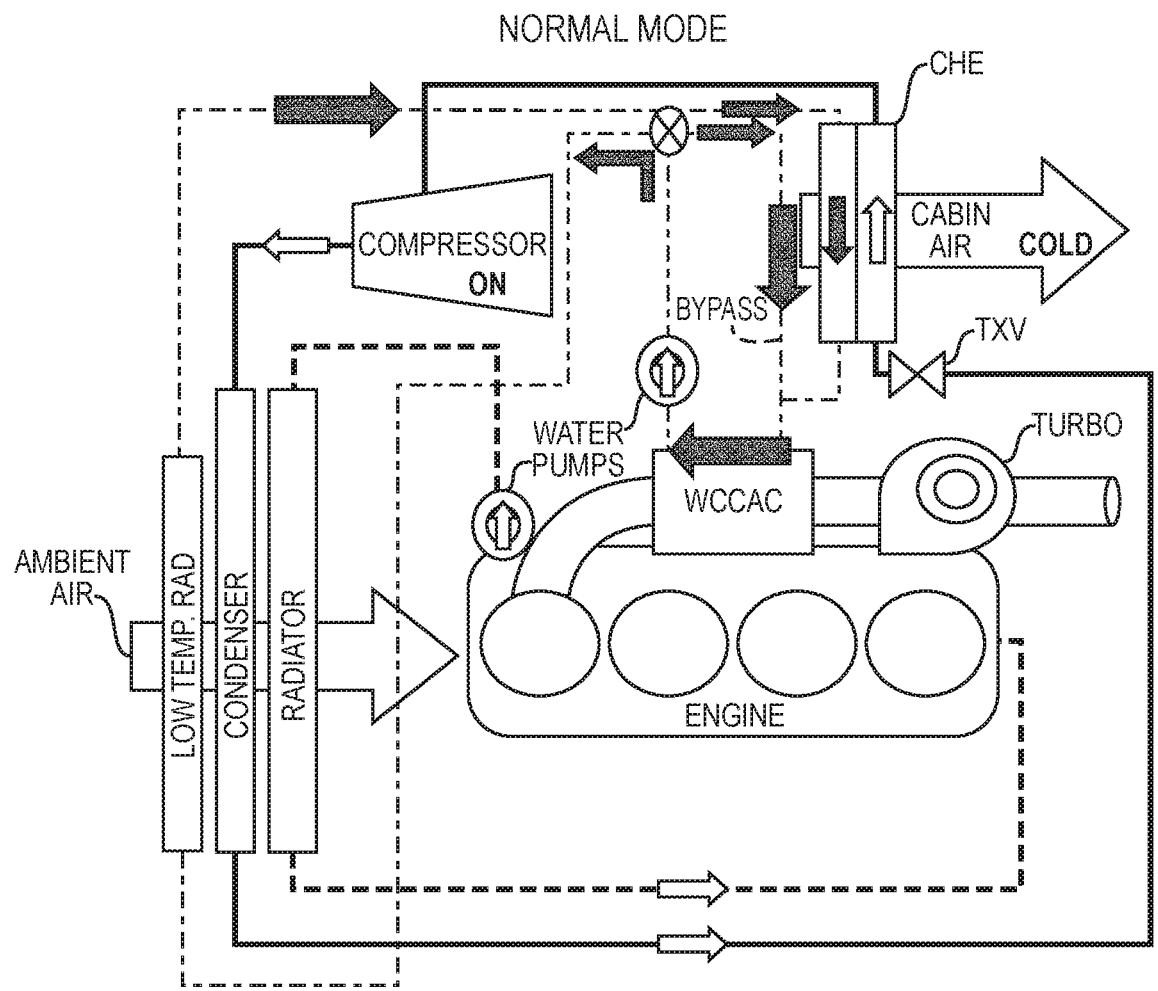

A fourth exemplary operation mode may correspond to a "normal mode," as shown in FIG. 7. As mentioned above, the normal operation mode may be the default operation mode of the HVAC-LCCAC system 200. In this operation mode, the switching unit 270 can control the flow path of heated liquid outputted from the LCCAC 210 such that the liquid is routed in a bifurcated manner. Particularly, after first passing all liquid through the low temperature radiator, a non-zero portion of the heated liquid can be routed by the switching unit 270 to the multifunction heat exchanger 260, while a second non-zero portion of the heated liquid can be routed through the bypass 290. The proportion of the first and second portions, respectively, of heated liquid outputted by the LCCAC 210 can be controlled dynamically by the ECU sending control signals to the switching unit 270 according to real-time ambient temperature measurements. The compressor 280 can be turned on to circulate the refrigerant, and the intake setting of HVAC system can be set according to the ambient temperature.

As an example, during the normal operation mode, the switching unit 270 can send a small amount of the heated liquid from the LCCAC 210 to the multi-function heat exchanger 260 after the low temperature radiator to slightly enhance performance of the engine 250 (e.g., see sport mode), while sending a large amount of the heated liquid to the bypass 290, avoiding the multi-function heat exchanger 260, in order to favor A/C performance (e.g., see comfort mode). Over time, the ECU can adjust the ratio of liquid sent to the bypass 290 versus liquid sent to the multi-function heat exchanger 260 based on real-time measurements of ambient temperature, cabin temperature, HVAC system settings, and the like. For instance, if the ambient temperature is warm and the user has turned on the air conditioning, the switching unit 270 can route more liquid from the LCCAC 210 to the low-bypass 290. On the other hand, if the ambient temperature is cold and the user has turned on the heat, the switching unit 270 can route more liquid from the LCCAC 210 to the multi-function heat exchanger 260.

The normal mode can be activated by default, for example, or after a different operation mode has ended. The operation mode can be deactivated upon the user manually activating a maximum cool setting (comfort mode) or a maximum heat setting (cabin warm up mode) through the HVAC system, or upon the user manually selecting the sport driving mode.

Figure 8A:
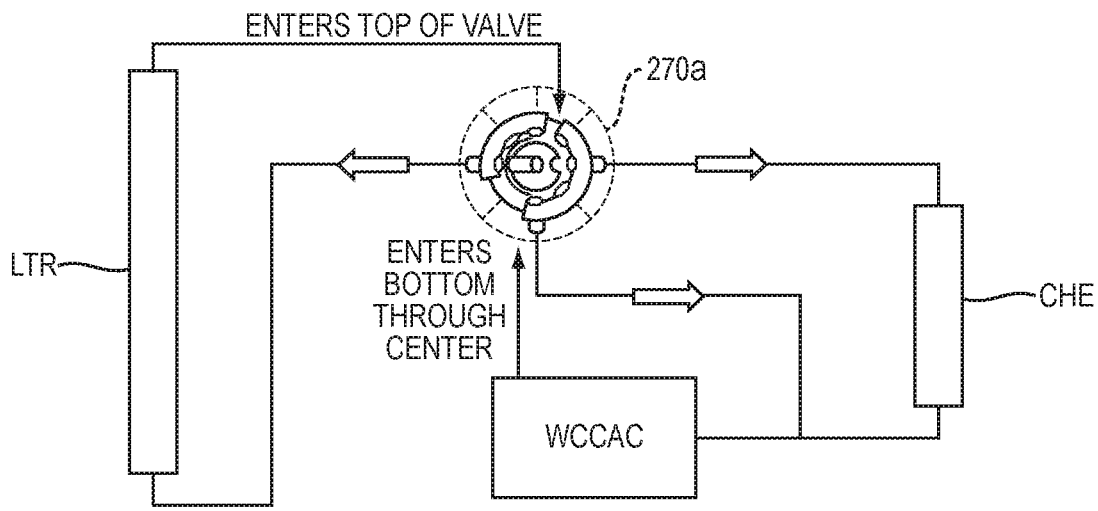
FIGS. 8A-8C include simplified, schematic views of example switching units for controlling the path flow of liquid in the HVAC-LCCAC system of FIG. 2.
Figure 8B:
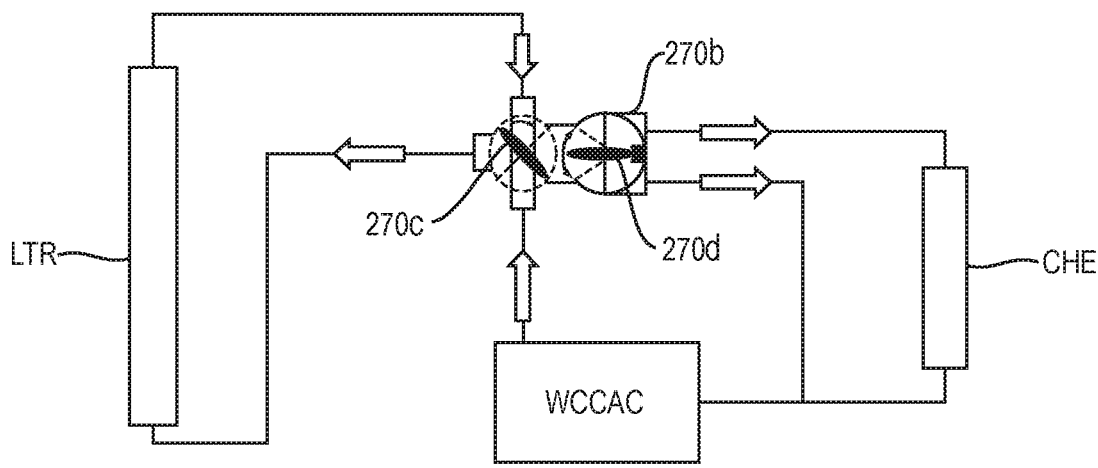
Figure 8C:
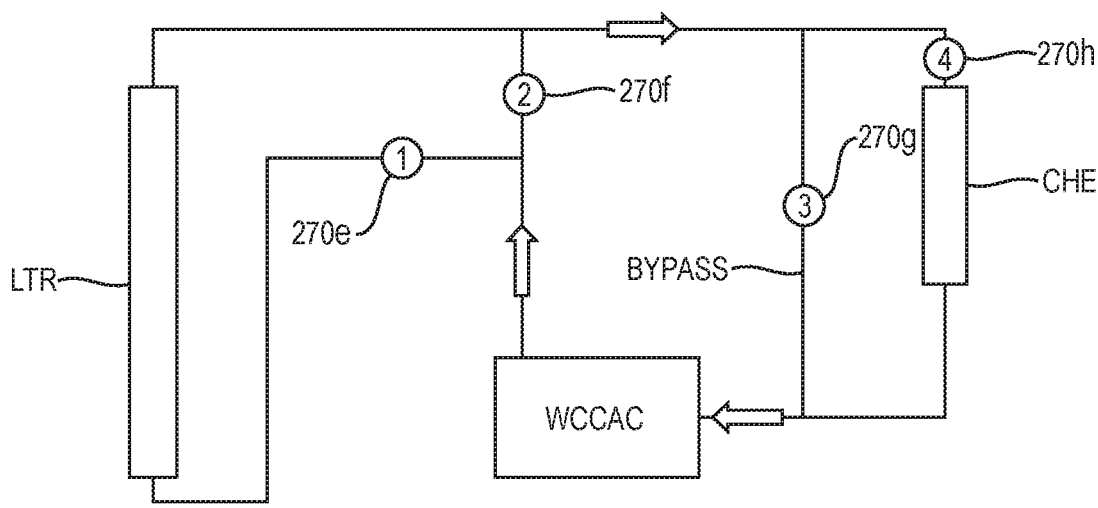

FIGS. 8A-8C include simplified, schematic views of example switching units 270 for directing flow of the heated liquid outputted by the LCCAC 210 through the LCCAC circuit in a particular manner. The switching unit 270 may include various devices capable of changing the flow direction of the liquid. In addition, it can be seen from FIGS. 8A-8C that the series of conduits comprising the LCCAC circuit can be modified in accordance with the switching unit 270 being employed.

For example, the switching unit 270 may include a single-valve switching unit 270*a*, as shown in FIG. 8A. The single-valve switching unit 270*a* may include a cylindrical valve designed to control all flow pathways from a single, centralized point. The single-valve switching unit 270*a* can be controllable by one actuator that rotates to various positions to join flow paths.

Figure 9A:
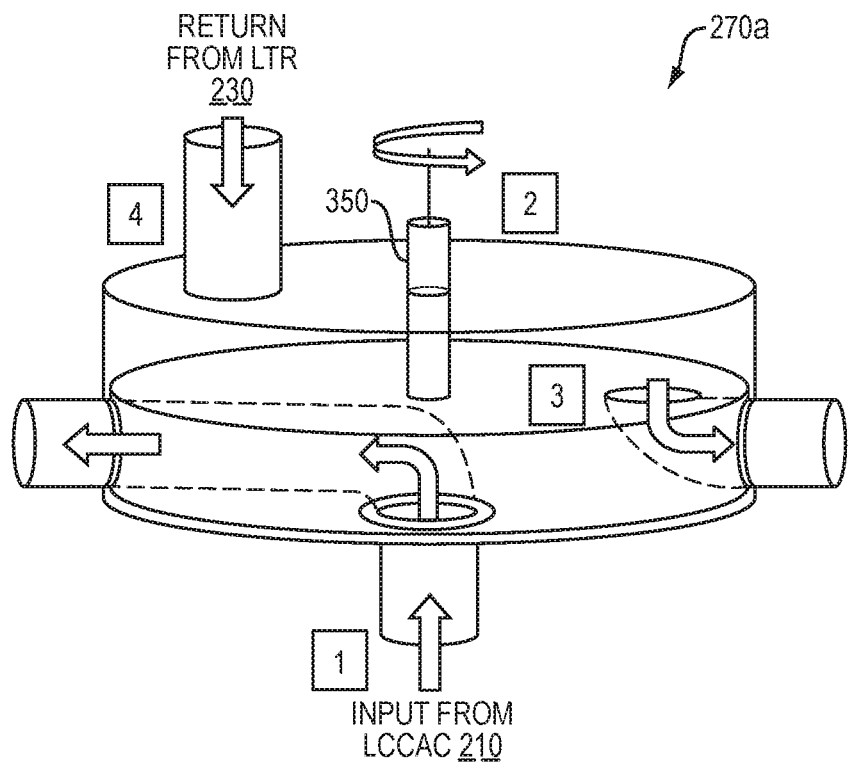
FIGS. 9A and 9B include a perspective view and a top view of a single valve switching unit.
Figure 9B:
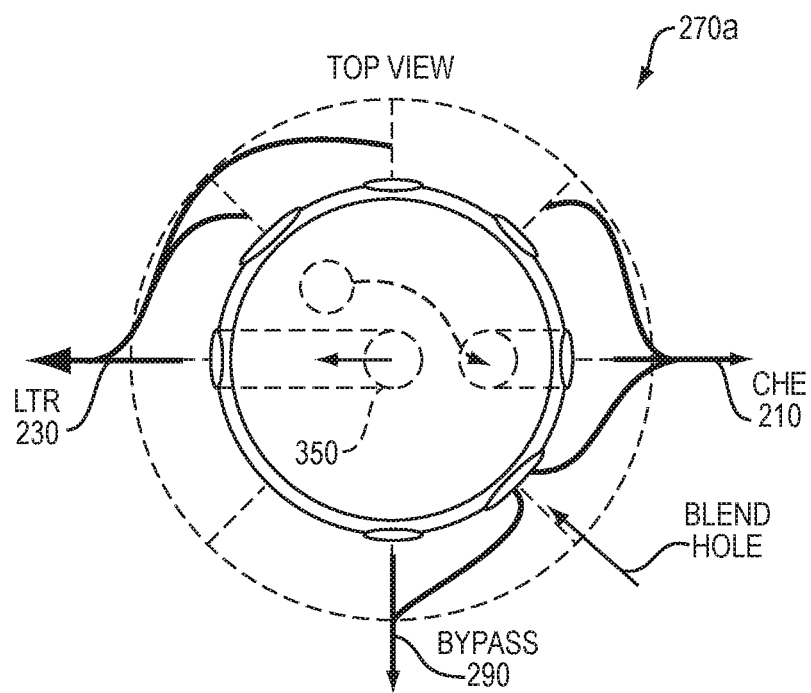

In further detail, FIGS. 9A and 9B include a perspective view and a top view of the single-valve switching unit 270*a*. At item '1', heated liquid outputted by the LCCAC 210 can enter the single-valve switching unit 270*a* at a bottom position of the valve. At item '2', Rotational inputs can rotate the internal cylinder 350 of the single-valve switching unit 270*a* to send the liquid flow to the low-temperature radiator 230 or multi-function heat exchanger. At position '3', the internal cylinder 350 of the single-valve switching unit 270*a* can rotate to send the liquid flow to the multi-function heat exchanger 260. Then, when the liquid returns to the single-valve switching unit 270*a*, the liquid can enter the top return passage at position '4'. The top view of the single-valve switching unit 270*a*, as shown in FIG. 9B, shows the various possible orientations of rotation for the cylinder 350 which can accommodate all drive modes previously described.

As another example, the switching unit 270 may include a single-manifold switching unit 270*b*, as shown in FIG. 8B. Similar to the single-valve switching unit 270*a*, the single-manifold switching unit 270*b* consists of one structure to control all flow of liquid outputted by the LCCAC 210. However, two control signals are needed from the ECU to control operation of the dual internal valves within the single-manifold switching unit 270*b*. For example, a first control signal can control the first internal valve 270*c* to direct flow between the low-temperature radiator 230 and the multi-function heat exchanger 260, and a second control signal can control the second internal valve 270*d* to direct flow between the multi-function heat exchanger 260 and the bypass 290.

As another example, the switching unit 270 may include multiple valves including valve switching units 270*e*, 270*f*, 270*g*, and 270*h*, as shown in FIG. 8C. The multi-valve configuration can require a separate control signal to control each valve switching unit 270*e*, 270*f*, 270*g*, and 270*h*. Each valve can open or close in different configurations to achieve a desired flow path.

Accordingly, the integrated HVAC-LCCAC system described herein can enhance vehicle cabin heating by harvesting heat from hot liquid produced by a LCCAC which uses liquid to cool hot, compressed charge air from a turbocharger or supercharger. Further, the integrated HVAC-LCCAC system can improve engine performance by utilizing a multi-function heat exchanger to cool liquid before it is supplied to the LCCAC. Even further, the integrated HVAC-LCCAC system can automatically adjust performance of the system based on a range of input parameters by controlling a switching unit that directs the flow of heated liquid throughout the LCCAC circuit.

The foregoing description has been directed to certain embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system for heating a cabin of a vehicle, the system comprising:
   a liquid-cooled charge air cooler configured to receive a liquid, to receive compression-heated air from one of a turbocharger and a supercharger of the vehicle, to cool the compression-heated air via the liquid, thereby heating the liquid, to output the cooled air to an intake manifold of an engine of the vehicle, and to output the heated liquid, wherein the compression-heated air is heated by compression at the one of the turbocharger and the supercharger; and
   a multi-function heat exchanger interconnected with the liquid-cooled charge air cooler, the multi-function heat exchanger configured to receive the heated liquid outputted by the liquid-cooled charge air cooler, to generate heated air via the heated liquid, and to output the heated air into the cabin of the vehicle, thereby heating the cabin of the vehicle,
   wherein the multi-function heat exchanger is further configured to output the liquid which is received by the liquid-cooled charge air cooler, and
   wherein the liquid output from the multi-function heat exchanger is supplies to the liquid-cooled charge air cooler without passing through the engine.

2. The system of claim 1, wherein the multi-function heat exchanger is further configured to cool the liquid and, after the liquid has been cooled, to output the liquid which is received by the liquid-cooled charge air cooler.

3. The system of claim 1, further comprising a low-temperature radiator connected between the liquid-cooled charge air cooler and the multi-function heat exchanger, the low-temperature radiator configured to receive the heated liquid outputted by the liquid-cooled charge air cooler, to cool the heated liquid via ambient air, and to output the cooled liquid.

4. The system of claim 3, wherein the multi-function heat exchanger is further configured to receive the cooled liquid outputted by the low-temperature radiator, to further cool the cooled liquid, and to output the further cooled liquid.

5. The system of claim 4, wherein the liquid-cooled charge air cooler is further configured to receive the further cooled liquid outputted by the multi-function heat exchanger, and to cool the compression-heated air received from one of the turbocharger and the supercharger via the further cooled liquid.

6. The system of claim 3, wherein the liquid-cooled charge air cooler is further configured to receive the cooled liquid outputted by the low-temperature radiator, and to cool the compression-heated air received from one of the turbocharger and the supercharger via the cooled liquid.

7. The system of claim 3, further comprising a switching unit configured to direct flow of the heated liquid outputted by the liquid-cooled charge air cooler to one or more of the multi-function heat exchanger and the low-temperature radiator.

8. The system of claim 7, wherein the switching unit includes a single-valve device, a multiple-valve device, or a single manifold.

9. The system of claim 7, wherein the switching unit is either electronically controlled or mechanically controlled.

10. A method comprising:
- receiving a liquid at a liquid-cooled charge air cooler disposed in a vehicle;
- receiving compression-heated air at the liquid-cooled charge air cooler from one of a turbocharger and a supercharger of the vehicle wherein the compression-heated air is heated by compression at the one of the turbocharger and the supercharger;
- cooling the compression-heated air by the liquid-cooled charge air cooler via the liquid, thereby heating the liquid;
- outputting the cooled air by the liquid-cooled charge air cooler to an intake manifold of an engine of the vehicle;
- outputting the heated liquid by the liquid-cooled charge air cooler to a switching unit through which the heated liquid passes;
- controlling the switching unit, thereby affecting a flow path of the heated liquid, in accordance with an operation mode of a plurality of predefined operation modes; and
- outputting the liquid, when having received the liquid in accordance with the operation mode, by a multi-function heat exchanger to supply the output liquid to the liquid-cooled charge air cooler without passing through the engine,
- wherein the multi-function heat exchanger is disposed in the vehicle and configured to generate heated air via the heated liquid and to output the heated air into a cabin of the vehicle thereby heating the cabin of the vehicle.

11. The method of claim 10, wherein the controlling of the switching unit comprises:
- identifying one or more input parameters including an ambient air temperature, a coolant temperature, an air temperature within a cabin of the vehicle, user input received via a heating, ventilation, and air conditioning (HVAC) system of the vehicle, and a user selection of a driving mode of the vehicle;
- selecting a particular operation mode among the plurality of predefined operation modes based on the one or more input parameters; and
- controlling the switching unit through which the heated liquid outputted by the liquid-cooled charge air cooler passes, thereby affecting the flow path of the heated liquid, in accordance with the determined operation mode.

12. The method of claim 11, further comprising:
- sending a control signal to the switching unit causing the switching unit to change the flow path of the heated liquid in accordance with the determined operation mode.

13. The method of claim 10, wherein the plurality of predefined operation modes include two or more of:
1) a cabin warm-up mode in which the heated liquid outputted by the liquid-cooled charge air cooler is routed to the multi-function heat exchanger,
2) a sport mode in which the heated liquid outputted by the liquid-cooled charge air cooler is routed to a low-temperature radiator disposed in the vehicle that is configured to cool the heated liquid via ambient air and to output the cooled liquid to the multi-function heat exchanger, wherein the multi-function heat exchanger is further configured to further cool the cooled liquid and to output the further cooled liquid to the liquid-cooled charge air cooler,
3) a comfort mode in which the heated liquid outputted by the liquid-cooled charge air cooler is routed to the low-temperature radiator and to avoid the multi-function heat exchanger, and
4) a normal mode in which the heated liquid outputted by the liquid-cooled charge air cooler is first routed to the low-temperature radiator, and then a first non-zero portion of the heated liquid outputted by the liquid-cooled charge air cooler is routed to the multi-function heat exchanger, and a second non-zero portion of the heated liquid outputted by the liquid-cooled charge air cooler is routed to a bypass.

\* \* \* \* \*